Dec. 17, 1929.　　　H. A. GENEST　　　1,740,236
GLASS SHAPING MACHINE
Filed Aug. 8, 1921　　　5 Sheets-Sheet 1
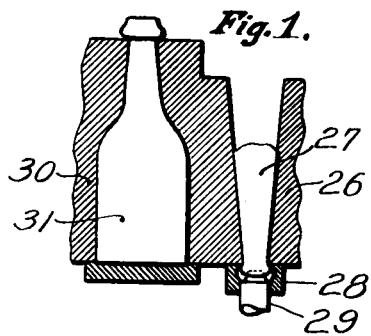
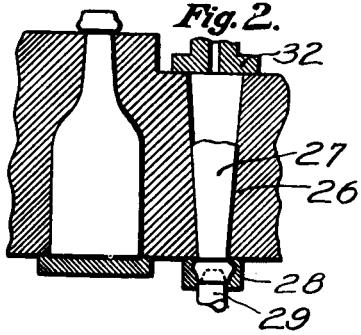
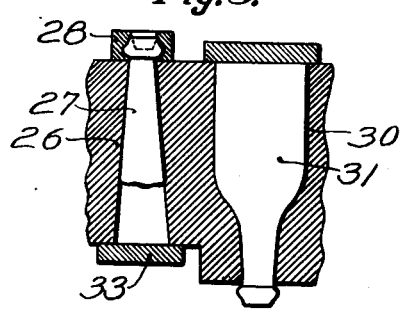
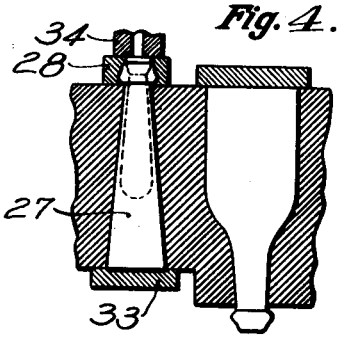
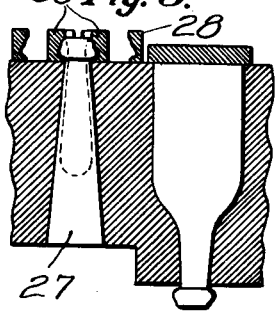
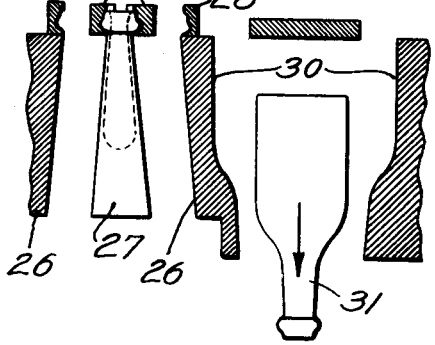
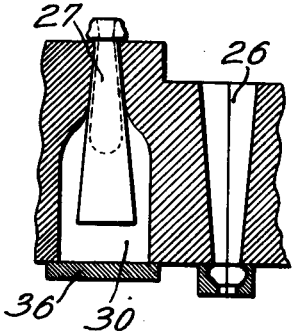
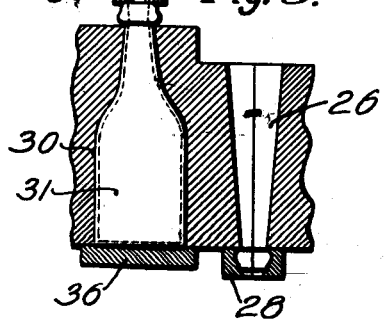
Inventor
Homer A. Genest
by: *W. H. Thurs*, Att'y.

Dec. 17, 1929.  H. A. GENEST  1,740,236
GLASS SHAPING MACHINE
Filed Aug. 8, 1921   5 Sheets-Sheet 2

Inventor
Homer A. Genest
by: *W H Homiss* Att'y.

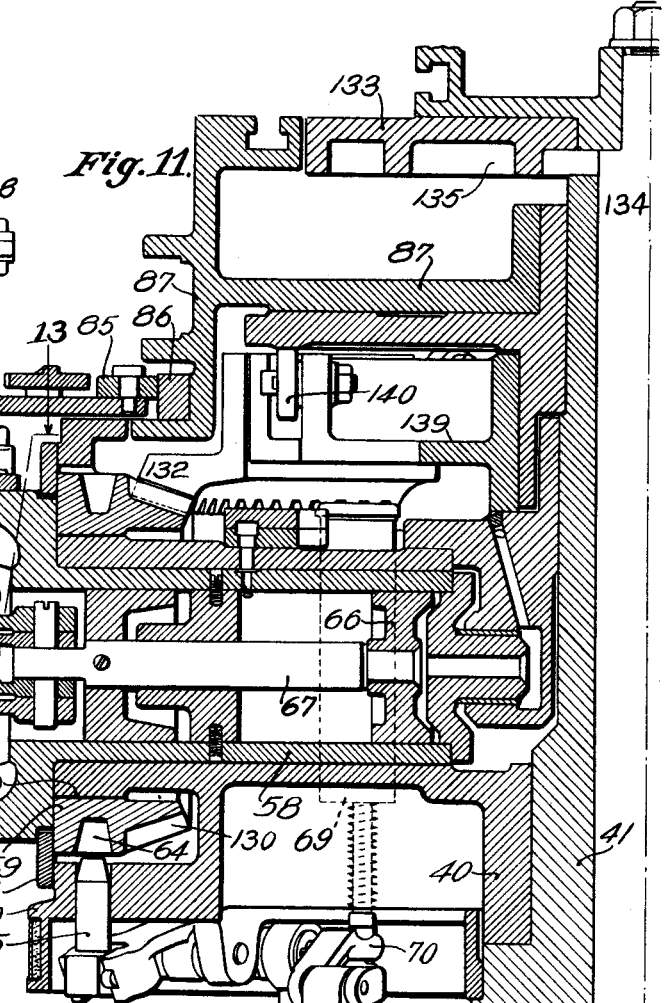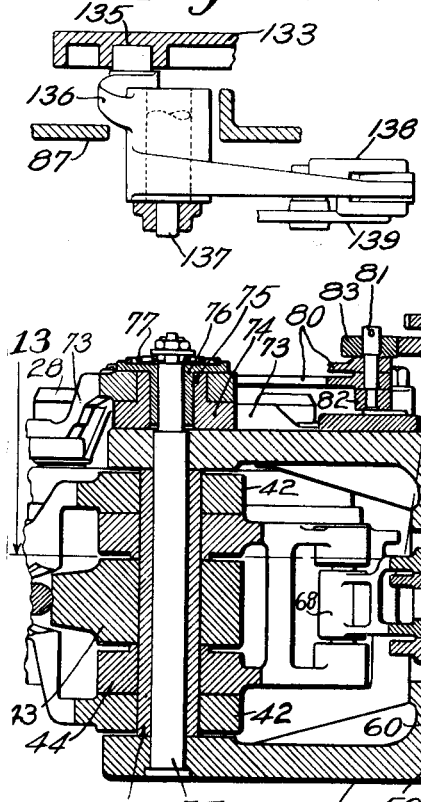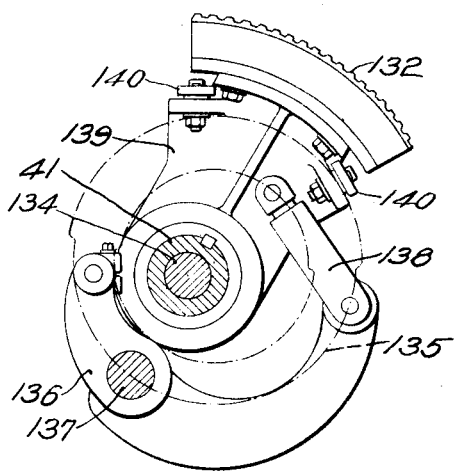

Inventor
Homer A. Genest
by: [signature] Atty.

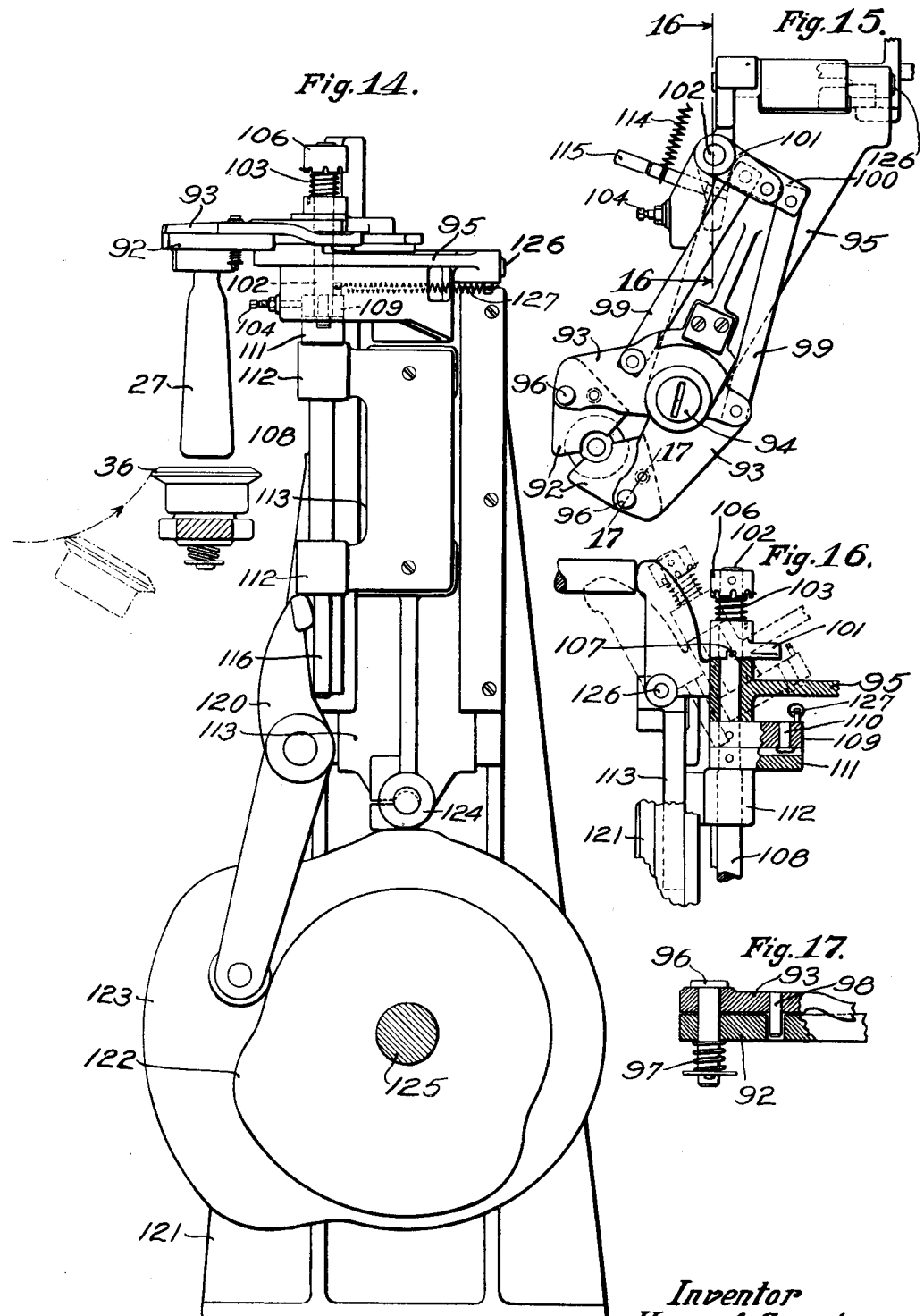

Patented Dec. 17, 1929

1,740,236

UNITED STATES PATENT OFFICE

HOMER A. GENEST, OF HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

GLASS-SHAPING MACHINE

Application filed August 8, 1921. Serial No. 490,597.

This invention relates to machines for shaping glassware. The particular embodiment of the invention herein described is for making bottles by the blowing process, but many features of the invention, with or without modification, are susceptible of use in other machines, and for other processes of shaping glassware.

The invention is herein shown and described as being embodied in a machine like that shown in the copending application of Edward H. Lorenz, Serial No. 490,567, filed Aug. 8, 1921. Some features of that machine shown herein for completeness of description are not claimed herein, as they are not of my invention, and are claimed in the Lorenz application and in divisions thereof. The machine is of the turret type, in which the turret carries a series of molds which are advanced by the movement of the turret to successive operating stations. The molds are arranged in pairs, each pair comprising a parison mold and a blow mold, which are arranged to be inverted and reverted about a common axis. The parison is transferred from the parison mold to the blow mold by transfer tongs positioned at one of the operating stations.

One object of the present invention is to provide a glass shaping machine of the type employing a plurality of molds which are successively presented to a series of operating stations, with new and improved means for automatically transferring the glass from one mold to another, and presenting the molds in proper positions for the several operations. This includes self-centering transfer tongs for transferring the parison from the parison mold to the blow mold, without using the neck ring or any other mold part as a transferring means. The self-centering feature of the tongs enables them to adjust themselves to variations which may occur in the positions of the parison when grasped, and also enables them to adjust themselves to similar variations in the closing positions of the blow molds when delivering the parisons thereto, thus avoiding bending or other distortion of the parison. During this transfer operation, the parison remains stationary except for the slight centering movement, and for a slight vertical movement hereinafter described, the transfer being effected by transposing the positions of the parison mold and the blow mold, thus bringing the blow mold to the parison, instead of carrying the parison to the blow mold, thereby avoiding the bending or other distortion of the parison, which sometimes occurs when the parison is moved any considerable distance sideways, which has been the common way of effecting such transfer.

The various features employed for the accomplishment of these and of such other objects as may hereinafter appear, will best be understood from the following description taken in connection with the drawings, in which :—

Figures 1 to 8 inclusive are diagrammatic views illustrating the principal steps in making a bottle by the present machine;

Fig. 11 is a vertical section through one of the mold carrying heads on the line 11—11 of Fig. 9;

Fig. 14 is a sectional elevation of the transfer tongs and their operating mechanism, taken on the line 14—14 of Fig. 9;

Fig. 15 is a plan view of the transfer tongs;

Fig. 16 is a vertical section taken on the line 16—16 of Fig. 15;

Fig. 17 is a vertical section on the line 17—17 of Fig. 15;

Fig. 18 is a detail view in vertical section, showing certain parts of Fig. 9, looking toward the top of that figure, and Fig. 19 is a detail plan view similar to Fig.

Figure 9:
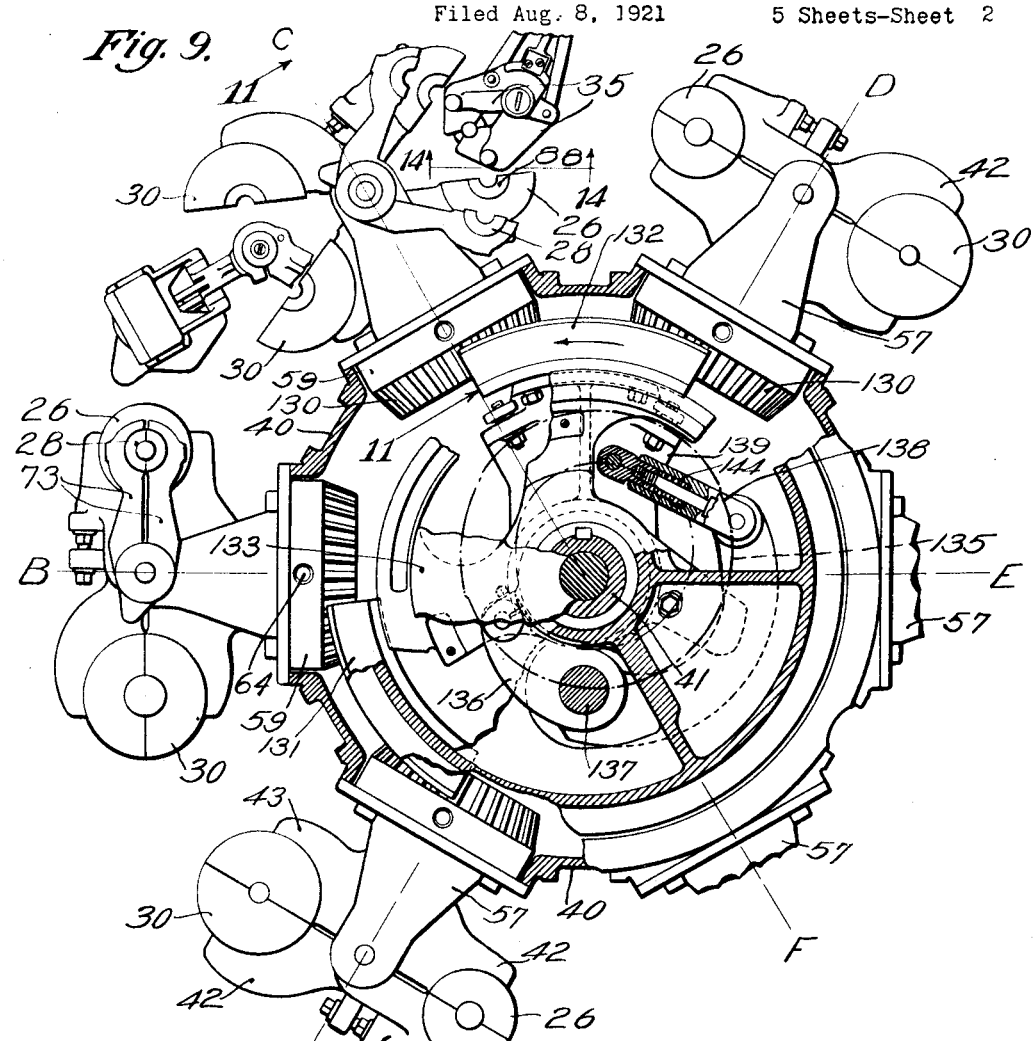
Fig. 9 is a sectional plan of the turret, certain parts being omitted and others broken away or indicated diagrammatically.

9, but showing only the mechanism for reverting the molds.

In the machine thus illustrated there are six pairs of molds, and six operating stations, the latter being indicated by the letters A, B, C, D, E and F. The successive positions of the molds, and the steps in the operation of making a bottle are illustrated in Figs. 1 to 8 inclusive. Fig. 1 illustrates the first operations occurring at the mold charging station A in the production of the bottle. A parison mold, preferably positioned with its larger bottom end uppermost, is indicated diagrammatically at 26, to which a charge of molten glass 27 has been delivered at station A from a punty or any suitable glass feeding apparatus. The neck portion of the mold is closed by a neck ring 28 and a plunger 29, which in a broad sense form a part of the mold, as they complete the mold cavity. At the time that the mold charge is delivered to the parison mold, the blow mold 30 contains a finished bottle 31, which resulted from the previous cycle of operations.

After the charge has been delivered to the parison mold, it is preferably packed into the lower end of the mold to cause it to assure a uniform shape and to form the top or "finish" of the bottle. This step is known as the "settle blow" and is indicated in Fig. 2, where a blow head 32 has closed the entrance to the parison mold and is supplying fluid pressure on top of the charge to settle or pack it in the mold. This also occurs at station A.

During the movement of the molds to station B, they are inverted, so that the molds arrive at that station in a position indicated in Fig. 3, the neck portion of the parison mold being up and that of the blow mold down. At that station the bottom of the parison mold is closed by a bottom plate 33, and the partly formed parison is ready for the counterblow, which expands it to fill the mold as indicated in Fig. 4. The counterblow pressure is supplied by a blow head 34, which moves down into engagement with the neck ring 28.

The molds are now advanced to the transfer station C where the neck ring 28 is opened, so as to permit the projecting finish of the parison to be engaged by transfer tongs 35 (Fig. 5). The molds are then opened (Fig. 6), leaving the parison suspended by the tongs and at the same time the previously formed bottle 31 is dropped, neck down, from the blow mold. The molds are now reverted while open, so as to transpose them, as shown by comparison of Figs. 6 and 7, in which transposed position the molds are closed as indicated in Fig. 7, where the suspended parison has been enclosed by the blow mold. The parison mold 26 is now positioned at station C, with the neck portion down, ready to receive another mold charge upon again arriving at station A.

The parison is now ready for the finishing blow which may occur at any time at or between stations D, E and F. Stations D, E and F are not distinctly operating stations, and in this embodiment of the invention the molds stop at these stations only because the turret stops to present other molds at stations A, B and C.

The bottom of the blow mold is closed by a bottom plate 36, permanently associated with the mold and blowing pressure is supplied by the blow head 34, which is brought into operative relation with the blow mold. Upon arrival at station A, the parison mold receives another mold charge and repeats the operations described, the bottle 31 then in the blow mold being discharged at station C.

The molds are carried on a turret 40 (Figs. 9 and 11) mounted to rotate about a fixed central column 41 and any well known mechanism may be employed for intermittently rotating the turret to advance the molds, step by step, to present them successively to the operating stations. Each pair of molds is mounted for rotation about a horizontal axis which is preferably disposed radially to the turret axis, and the molds are inverted and reverted by revolving them on the horizontal axis to present them for the various operations.

Figure 12:
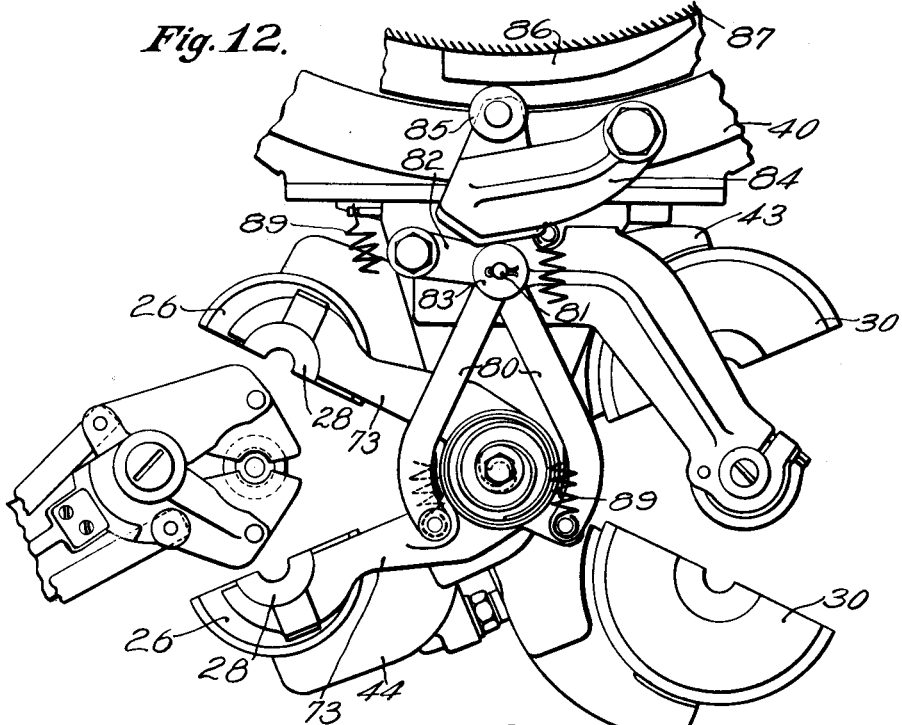
Fig. 12 is a plan view of a pair of molds in open position and certain cooperating parts.
Figure 13:
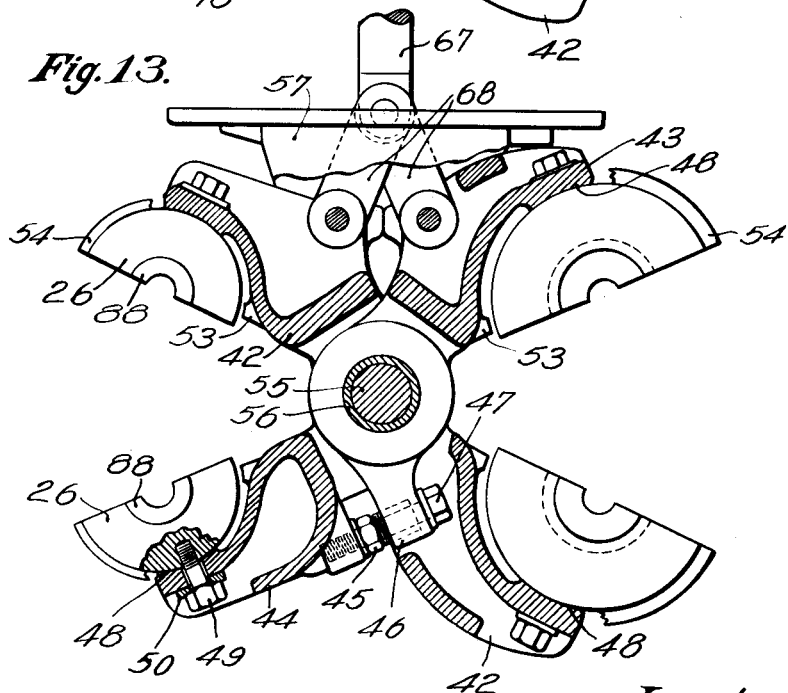
Fig. 13 is a horizontal section through the molds of Fig. 12, taken substantially on the line 13—13 of Fig. 11.

The several pairs of molds are identical; therefore, but one need be described in detail. The parison mold 26 and the blow mold 30 (Figs. 12 and 13) are split diametrically and one half of each mold is mounted on a carrier. The two carriers are crossed like the letter X and mounted on a common axis at their intersection, whereby the molds are simultaneously opened or simultaneously closed by the movement of the carriers. The upper half of the parison mold 26 and the lower half of the blow mold 30, as viewed in Figs. 12 and 13, are mounted on an integral carrier 42. In order that both molds may close tightly to avoid the formation of fins on the parison or bottle, the other half of each mold is mounted on a carrier comprising arms 43 and 44 which are rigidly, but adjustably, secured together forming, in use, an integral carrier similar to carrier 42.

The adjustable connection between the arms 43 and 44 is provided by a tubular stop screw 45 threaded into a lug 46 on the hub of the arm 43 and abutting a lug on the arm 44. The stop screw is held seated against the lug of the arm 44, by a screw 47 which passes loosely through the stop screw 45 and is threaded into the arm 44.

One feature of the invention relates to the construction by which one half of each mold is adjustably mounted in its carrier, so that it may be shifted about its longitudinal axis in order to so position the mold halves that the mating sides of each mold will both come into firm contact. The carriers are provided with pads 48 (Fig. 13) forming a cylindrical seat to receive the corresponding surface of each mold half. One half of each mold is adjustably secured in this seat by a screw 49 (Fig. 13), which passes through a clearance hole in the carrier and has the lower side of its head provided with a spherical surface. This surface is seated in a complemental recess in a washer 50 and the screw serves to hold the mold half firmly seated on its carrier. In order to secure the proper angular relation between the two halves of each mold, so that both sides come in firm contact, the screw 49 is loosened and the molds are closed. This will cause the loosened mold half to rock in the pad 48 of the carrier, about its longitudinal axis until all abutting edges of the halves come into firm contact. This may change the angular position of the screw 49, but on account of the spherical surface on the screw head and the washer 50, this slight angular displacement does not prevent the mold from being rigidly secured in this adjusted position by tightening the screw. The molds are also supported vertically by lugs 53 which engage flanges 54 on the molds.

The mold carriers are mounted for opening and closing movement about a stud 55, and in order to facilitate the removal of the carriers as a unit, they are not mounted directly on the stud 55, but on a bushing 56 which surrounds the stud. The stud is mounted in the forked end of a mold head 57 (Fig. 11) having formed integral therewith a cylinder 58 which is rotatably mounted with its axis in substantially radial relation to the turret.

In order that expansion of the cylinder due to heat conducted to it from the molds may not cause the cylinder to become fixed in its bearing in the turret 40, the principal outer bearing of the mold head is made between the inner surface of the gear ring 59, which is fixed to the mold head, and the corresponding exterior surface 60 of the turret (Fig. 11). Thus, when the bearing member 59, carried by the mold head, expands more than the surface 60, it will cause only a slight looseness of the bearing instead of causing it to bind. The ring 59 is secured to the mold head 57 by suitable screws (not shown) and the head is held in the turrent by a flange 61. The ring 59 is provided with oppositely disposed sockets 64 for receiving locking bolts 65, by which the mold head is locked in either of its two rotative positions.

The molds are opened and closed by compressed air which actuates a piston 66 (Fig. 11) in the cylinder 58, having a rod 67 connected by links 68 (Fig. 13) with each mold carrier. The air is admitted to one side or the other of the piston by a valve 69 (Fig. 11) associated with each mold head. The valve 69 admits air to the right of the piston 66 which acts to hold the molds closed at all times except when the mold is at the transfer station C, at which time the valve 69 is positioned above a cam controlled actuator 70 which positions the valve 69, so as to admit air to the left of the piston 66 which then moves to the right and opens the molds. The actuator 70 is lifted at the proper time by a cam 71, acting upon a plunger 72 in line with the stem of the valve 69.

Each parison mold 26 has associated therewith a split neck ring 28 (Fig. 12), capable of being opened and closed independently of the mold, although in the preferred construction, the closing of the neck ring is controlled by the closing of the mold. The neck ring is split diametrically like the mold and each half is carried by an arm 73 pivotally mounted on the stud 55.

It is important that the neck ring when closed shall make a firm contact with the mold and, therefore, particular provision is made to allow for expansion of the parts when heated and to take up wear. For this purpose the hub 74 (Fig. 11) of one of the neck ring arms 73 is provided with an integral bushing 75 forming a bearing for the other neck ring arm. The hub of the upper arm and the hub 74 of the lower arm are both held down against the fork of the mold head 57, by a flanged bushing 76 which is under the influence of a conical spiral spring 77, seated against a nut on the stud 55. By this construction the hubs of the arms 73 may expand against the compression of the spring 77 which also acts to take up axial wear. If, for any reason, the neck rings are lifted above their normal plane, the spring permits this movement without breakage and returns the parts to normal position when the cause is removed.

As the mold head is brought to the transfer station C, by the rotation of the turret 40, the neck ring 28 is opened. The mechanism for opening the neck ring comprises a pair of links 80 (Fig. 12) connected with the neck ring arms 73 on opposite sides of their pivotal point. Both links are connected by a pin 81, with an arm 82 pivotally mounted on the mold head 57. The pin 81 also carries a roll 83 in position to be engaged by an arm 84 pivotally mounted on the turret 40 and carrying a roll 85 which, as the turret advances, is engaged by a cam 86 carried on a cylinder 87 fixed on the column 47. The cam 86 acts to open the neck rings as they approach station C, leaving the neck of the parison projecting from the parison mold, so that it may be engaged by the tongs 35.

After the parison has been engaged by the tongs, as will be described, the molds are opened and then reverted. When the molds are opened, a hub 88 (Figs. 9 and 13) projecting slightly above the top of the mold, moves into approximate contact with the walls of a corresponding recess in the neck ring so that when the mold head is turned about its axis and the roll 83 which has been holding the neck ring open moves away from the arm 84, the neck ring will be held by the parison mold in the approximate position to which it was opened (Fig. 12). In Fig. 9 the neck ring is shown open beyond its normal position, in order to show the parison mold and the projecting hub 88, which would otherwise be partly covered by the neck ring. When the molds are closed, the neck ring is also closed by springs 89 (Fig. 12) and remains closed until it is again opened by the arm 84 at the next approach to station C.

The projecting neck of the parison above the hub 88 at the transfer station is engaged by jaws 92 (Fig. 15) of the tongs 35. These jaws are mounted on carriers 93 pivotally mounted on a pivot 94 fixed in a horizontal arm 95. The carriers are arranged for a shear-like movement to cause the jaws 92 to grip the neck of the bottle, and in order that the jaws may accommodate themselves to slight variation in the position of the successive parisons, they are arranged for a floating movement on the carriers. Each jaw is pivotally connected with one of the carriers, by a stud 96 and the jaw is held upwardly against the carrier by a spring 97 (Fig. 17) surrounding the lower end of the stud. Movement of the jaw on its carrier is limited by a pin 98 fixed in the carrier, and entering a hole in the jaw which is of sufficient size to permit suitable pivotal movement of the jaw about the stud 96. Thus the jaws are shifted by the neck of the parison to accommodate themselves to variations in the position of the parison on a line radial to the pivot 94.

The floating movement of the jaws in the other direction is permitted by a construction comprising links 99 connecting the jaw carriers with the respective ends of an equalizing lever 100. This construction enables the transfer tongs to float in any horizontal direction, centering themselves with the parison before it is released by the parison mold, and permitting the parison to center itself with the blow mold as the latter closes around the neck of the parison. Power for opening and closing the jaws is applied to the lever 100 between the links 99, by an arm 101 mounted on the end of a rock shaft 102. Thus, if one jaw 92 engages the parison before the other, the lever 100 will rock until both jaws engage the neck with equal pressure.

The jaws are closed by a clockwise movement of the rock shaft 102 (Fig. 15), and in order that the neck of the parison may not be broken or distorted by excessive pressure of the jaws, the closing movement of the arm 101 is transmitted from the rock shaft 102 through a spring 103 (Figs. 14 and 16). The arm 101 is loosely mounted on the rock shaft 102, and it is engaged by one end of the spring 103 of which the other end is engaged by one of the slots in a collar 106 fixed on the rock shaft 102, by which the torsional strain on the spring may be adjusted. The thrust of the spring 103 is taken, when the jaws are open, by a pin 107 (Fig. 16), engaging one end of a slot formed in the hub of the arm 101. The tongs engage the neck of the parison with a firm but delicate grip as determined by the spring 103 and the excess movement of the rock shaft 102 is taken up by the spring. The closing movement of the rock shaft 102 is limited by a stop screw 104 which is positioned to engage an arm 109 on the shaft 102 just after the jaws engage the parison. The rock shaft 102 is actuated from a rock shaft 108 with which it is connected by a separable clutch comprising a pin 110 in an arm 109, the head of which is engaged by a slot in an arm 111 fixed on the rock shaft 108. The rock shaft 108 is mounted in bearings 112 carried by a slide 113 on which the tongs arm 95 is mounted. The rock shaft 108 is turned in one direction by a spring 114 (Fig. 15) connected with a pin 115 projecting from a wide arm 116 fixed on the bottom of the rock shaft. The rock shaft is turned in the other direction, to open the tongs, by a lever 120 pivotally mounted on the standard 121 and having a roll in engagement with a cam 122.

A bottom plate 36 is permanently associated with each blow mold and when the molds are reverted so as to enclose the parison within the blow mold, the bottom plate comes up with the mold on the arc of a circle approximately as indicated by the dotted line in Fig. 14. If the parison is sufficiently long to be engaged by the bottom plate during its arcuate movement, the bottom end of the parison may be moved slightly to one side and out of central alignment with the blow mold when it is closed, resulting in a defective bottle. In order to avoid this possibility, the parison is lifted slightly until after the mold and bottom plate have completed the reverting movement, and then lowered toward the bottom plate and into proper vertical alignment with the mold. The tongs are moved vertically for this purpose and also to avoid interference of the parts during the idle period of the tongs by a cam 123 (Fig. 14) acting upon a roll 124 carried by the slide 113. The cams 122 and 123 are mounted on a shaft 125 connected with the turret 40 so as to make six rotations to one complete rotation of the turret, so that the cams make one rotation during the time each mold is at station C, and the time required in transit to or from one of the adjacent stations.

The parison mold opens to a sufficient extent to permit the mold halves to clear the tongs as the mold moves upwardly during the reversion (Fig. 12). If the molds should fail to open on account of adhering glass or for other reasons, the parison mold on its upward movement during the reversion, collides with the tongs and provision is made whereby the tongs are lifted by such a collision. For this purpose the arm 95 is pivotally mounted at 126 (Fig. 16) on the slide 113 so that it may be lifted into the position shown in dotted lines, without injury to the parts.

If the molds thus fail to open, the tongs will be lifted while gripping the neck of the parison and turning about the pivot 126, while the body of the bottle is engaged by the mold moving about another axis. In order to avoid the strain which would occur from such a condition, provision is made for releasing the tongs from the parison whenever they are lifted by the parison mold. As soon as the arm 95 starts to lift, moving toward the dotted line position (Fig. 16), the connection between the rock shafts 102 and 108 is broken by the withdrawal of the pin 110 from the slot in the arm 111, allowing the actuating shaft 108 to turn without turning the tongs. In order that the jaws may also be opened as soon as this occurs, the arm 109 on the shaft 102 is connected by a spring 127 (Fig. 14) with a fixed part of the arm 95, which moves the rock shaft and opens the jaws 92, releasing the parison neck.

Figure 10:
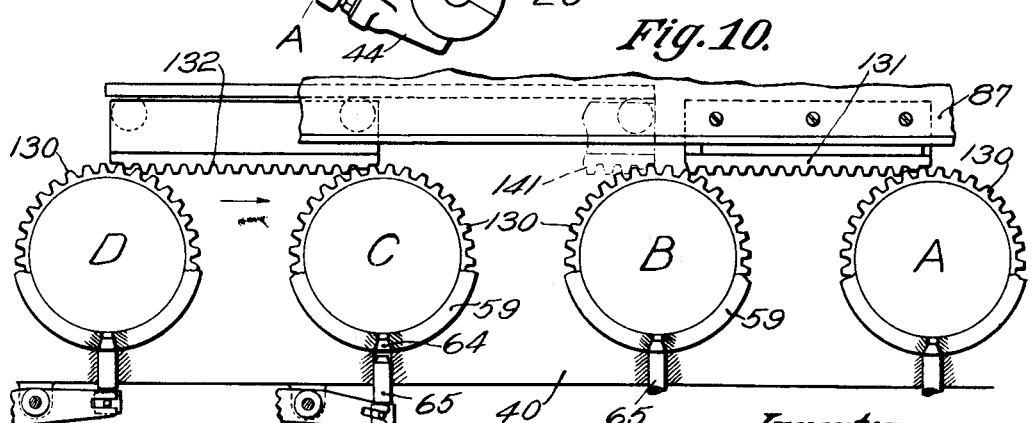
Fig. 10 is a diagrammatic development of a part of the mold inverting and reverting mechanism, covering four of the working stations, the view being in elevation, looking toward the center of the machine.

The mold heads are inverted during their traverse from station A to station B by the engagement of a gear 130 (Figs. 9, 10 and 11) formed on each of the rings 59, with a stationary toothed rack 131 mounted on the cylinder 87. The teeth on the rack 131 are cut away on the end adjacent station A so that the gear may move up to this station without being turned by the rack (Fig. 10), but as soon as the gear moves from station A toward station B, it will be inverted by rolling over the rack.

The mold heads are reverted during their dwell at station C by a movable toothed rack 132 (Figs. 9 and 19), which is turned in a counter-clockwise direction to invert the mold head at station C by connections with a constantly rotating cam 133 (Figs. 9, 11 and 18) fixed on the upper end of a shaft 134 mounted within the column 41. The path 135 (shown in dot and dash lines) on the cam 133 engages a roll on one arm of a lever 136 mounted on a fixed pivot 137 and having its other arm offset so as to lie in a plane below the web of the cylinder 87. This arm of the lever is connected by a telescopic link 138 with the carrier 139 of the rack 132. The carrier is mounted to swing about the column 41 and is provided with anti-friction rollers 140 to take the upward thrust of the gears. The cam path 135 is so shaped that during approximately a half revolution it moves the segment 132 from the position shown in full lines in Fig. 10 to the dotted line position indicated at 141, thus reverting the molds. The telescopic link 138 is held in extended position by a spring 144 which allows a slight yielding action at the ends of the rack movement.

The rack 132 is returned to its starting position by the next advancing step of the turret. The cam path 135 is provided with a wide inoperative portion extending throughout approximately 180 degrees (Fig. 19), which, if desired, may be entirely cut away, and which receives the roll after the working stroke of the rack. Before the roll is again engaged by the working part of the cam path, the movement of the turret, through the engagement of the gear 130 at station B with the rack, has returned it to its starting position. At about the time the rack comes to rest with the turret, the roll is again engaged by the working part of the cam path which thereafter reverts the next mold head.

The specific embodiment of the invention which has been described has been selected for the purpose of illustration only, and it is to be understood that the invention is capable of various modifications both as to the separate parts, and the combinations thereof, within the skill of an artisan, without departing from the scope of the invention as defined by the appended claims, whereby the various features may be modified to suit widely varying conditions encountered in the manufacture of glassware.

I claim as my invention:—

1. In a glass blowing machine, the combination of a parison mold, a neck ring permanently associated therewith, means for opening and closing the neck ring and the mold, a blow mold, means independent of the mold parts for supporting the formed parison during and after the opening of the parison mold, and means for closing the blow mold about the supported parison.

2. An automatic glass blowing machine having in combination a parison mold adapted to receive a charge of molten glass, an associate blow mold for blowing parisons made in said parison mold, means for presenting said parison mold to a charging station at a definite time, means for forming the parison in the parison mold in definite timed relation to the charging thereof, and means effective at another and subsequent definite time in relation to the charging and parison forming operations for transferring the parison so formed to the associate blow mold; the last named means including parison supporting tongs actuated in timed relation with the formation of said parison initially to engage the parison while it is still in the parison mold and immediately before the transfer and to support the parison during the said exchange of the blow mold for the parison mold, and means for moving said blow mold to the axial position initially occupied by said parison mold.

3. In a glass blowing machine, the combination with a rotating turret, of a plurality of pairs of molds carried thereby, each pair consisting of a parison mold, a neck ring associated therewith and a blow mold, means for opening the neck ring, supporting means for engaging the portion of a parison released by the neck ring while said parison is contained in the parison mold of a pair, means for then opening the parison mold, means for then removing said parison mold and moving said blow mold to the axial position initially occupied by said parison mold, means for then closing the blow mold of the pair about the engaged parison, means for then disengaging the supporting means from the parison, and means for then expanding the parison in the blow mold.

4. In a glass blowing machine, the combination of a parison mold, a neck ring permanently associated therewith, means for opening the neck ring before the parison mold is opened, a blow mold, means for engaging the portion of the parison exposed by opening the neck ring and supporting the parison at a fixed transfer station, means for opening the parison mold and closing the blow mold about the parison while the parison is so supported, and means for disengaging said supporting means from the parison when the blow mold has been closed.

5. In a glass blowing machine, the combination with a series of intermittently moving parison molds successively moved to a fixed transfer station, and a similar series of blow molds successively presented to the same station, of parison engaging tongs at said station adapted to engage the projecting portion of a parison held by a parison mold, means for opening the parison mold at the fixed station when the parison has been engaged by the tongs, means for then closing a blow mold about the parison, and means for then disengaging the tongs from the parison to permit the mold and parison to be moved from the fixed transfer station.

6. In a glass blowing machine having, in combination, a parison mold having a neck ring associated therewith, a finishing mold associated therewith, means for intermittently moving said molds between a series of operating stations, means located at one of said stations for automatically opening said molds to release a blown bottle from the finishing mold and to release a parison from the parison mold, means for interchanging the positions of said molds and for closing said finishing mold about the said parison during the period of dwell of said molds at said station, and means independent of said neck ring for supporting said parison during the interchange of said molds.

7. The combination in a machine for shaping molten glass provided with a parison mold and a blow mold having partable bodies and mounted for inversion about a common axis, of means for transferring the parison, including means independent of the said mold bodies for supporting the parison for transference, and means for opening the parison mold, then transposing the molds by said rotation, and then closing the blow mold around the parison.

8. The combination in a machine for shaping molten glass, provided with a plurality of molds having partable bodies, of means for transferring the glass from one mold to another, including means independent of the said mold bodies for supporting the glass during transference, and means for opening the mold containing the glass, then inverting the molds to bring the next mold into substantially the position of the first mold, and then closing the second mold around the glass.

9. An automatic machine for shaping molten glass having in combination, a parison mold and a blow mold having partible bodies and mounted for rotation about a common axis, means for forming a parison in said parison mold, means independent of said mold bodies for supporting the parison so formed, means for opening and closing said molds, means for inverting the molds to transpose their positions, and timing means for causing the molds to be inverted, the parison to be supported, the molds to open and the molds to close in timed relation each with the others.

10. A glass blowing machine having in combination a parison mold and a blow mold mounted for inversion about a common axis, means for delivering a charge of molten glass to the parison mold while the neck portion of the mold is down, means for inverting the molds, means for forming a parison in the parison mold from the charge, means for supporting the parison independently of the molds, and means for opening the molds, reverting them to reverse the relative position of the molds, and then closing the molds whereby the parison is enclosed by the blow mold.

11. A glass blowing machine having in combination, a turret, a pair of molds comprising a parison mold and a blow mold, revolubly mounted on the turret; means for intermittently rotating the turret to present the molds at a series of operating stations, means for delivering a charge of glass to the parison mold at one of the stations, means for inverting the molds, means for blowing a parison in the parison mold, means for supporting the parison at a subsequent station independently of the molds, means for opening the molds while the parison is so supported, means for reverting the molds at said subsequent station, means for closing the molds after reversion whereby the parison is enclosed by the blow mold, and means for applying a finishing blow to the parison in the blow mold.

12. In a glass blowing machine, the combination of a parison mold, a blow mold, a head carrying both molds, means for inverting said head and molds, means for simultaneously opening and closing both molds, and means for supporting the parison in one position and out of contact with said molds during the inverting operation.

13. In a glass shaping machine, the combination with a turret mounted for rotation about a vertical axis, an invertible mold carrier mounted on said turret, a blank mold and a blow mold mounted on said carrier, a neck ring associated with said blank mold, means for opening and closing said molds and neck ring, means for intermittently rotating the turret to bring the carrier successively to a charging station, a counterblowing station, a transfer station, and one or more cooling stations, means for inverting the mold carrier during its passage from the charging station to the counterblowing station to interchange the positions of said molds relative to the blank, and means for supporting the bare blank during the inversion of said mold carrier.

14. In a glass shaping machine, the combination with a rotatable turret, an invertible mold carrier mounted on said turret, a blank mold and an associated blow mold mounted on said carrier, a neck ring cooperating with said blank mold, means for opening and closing said molds and neck ring, means for intermittently rotating the turret to bring the carrier successively to a charging station, a counterblowing station, a transfer station, and one or more cooling stations, means for inverting the mold carrier during its passage from the charging station to the counterblowing station, means for reverting the carrier at the transfer station to substitute the blow mold for the blank mold, and tongs mechanism for supporting the bare blank during the reversion of said mold carrier.

15. In a glass shaping machine, the combination of a parison mold and a blow mold mounted in reverse relation relative to each other, a blowhead, and means for inverting said molds about a common horizontal axis to successively enclose a glass blank and present it in neck-up position to said blowhead to counterblow a parison in said blank mold and to thereafter blow said parison to final form in said blow mold.

16. In a glass shaping machine, the combination of a table, a parison mold and a cooperating blow mold carried by said table and disposed in reverse relation to each other, means for intermittently rotating said table to carry said molds to successive stations, and means located adjacent to the path of travel of said molds for reversing the positions thereof during the period of dwell in the rotation of said table.

17. A machine for shaping molten glass, having in combination a turret, a mold carried by the turret, means for intermittently rotating the turret to present the mold at a series of operating stations, means for inverting the mold during transit from one station to another, and means for reverting the mold while the turret is stationary.

18. In a glass shaping machine, the combination of a turret carrying a plurality of invertible molds, means for intermittently rotating said turret, a fixed rack for inverting said molds during the rotation of said turret, a movable rack for inverting said molds while the turret is stationary, and means for returning the movable rack to its initial position by the movement of the turret, while the mold is inverted.

19. In a glass shaping machine, the combination with a turret carrying a plurality of invertible molds, of a rack, cooperating gears connected with each mold, means for moving the rack relative to the turret to invert a mold, and means to return the rack by engagement with a gear moving with the turret.

20. In a glass blowing machine, the combination with a turret rotatable about a vertical axis, an invertible mold carrier mounted on the turret, a blank mold, a blow mold and a neck ring, all permanently carried with the mold carrier, means for opening and closing the neck ring, means for intermittently rotating the turret to present the carrier successively at a charging station, a counterblow station, a transfer station and one or more cooling stations, means for inverting the mold carrier during its passage from the charging station to the counterblow station, and means for automatically reverting the carrier during a period of dwell in the rotation of said turret and before it again passes to the charging station.

21. In a glass blowing machine, the combination with a turret rotatable about a vertical axis, of an invertible mold carrier mounted on the turret, a parison mold, a blow mold and a neck ring all carried by and invertible with the mold carrier, means for opening and closing said molds and ring in fixed timed relation, means for intermittently rotating the turret at regular intervals to present the carrier successively at a charging station, a counterblow station, a transfer station and one or more cooling stations, means for automatically inverting the molds and neck ring prior to their presentation at the charging station, so that the parison mold shall be neck down to receive a charge of molten glass, means for automatically reverting the molds and ring as they pass from the charging station to the counterblow station, and means for blowing the parison to a definite form at the counterblow station.

22. In a glass shaping machine, the combination of a pair of ware supporting tongs mounted a vertically movable slide, a shaft mounted on the slide and connected to control the opening and closing of the tongs, a lever having a sliding connection with the shaft, and means for actuating the slide and the lever.

23. Tongs for supporting glassware, having in combination, ware engaging jaws, a link connecting each jaw with an end of an equalizing lever and means for applying power to the lever between the links to close the jaws.

24. In combination with a plurality of movable blank molds and blow molds, a device located at a transfer station for transferring parisons from said blank molds to their cooperating blow molds, said device comprising a fixed support, jaw carriers pivotally mounted on said support for horizontal movement about a common pivot, jaws pivotally mounted on said carriers, means for actuating said carriers to close said jaws, and a connection between said actuating means and said carriers for permitting said jaws to move relative to said support when in a closed position in order to enable said jaws to centralize at slightly different axial positions at said transfer station.

25. In combination with a plurality of movable blank molds and blow molds, a device located at a transfer station for transferring parisons from said blank molds to their co-operating blow molds, said device comprising a fixed support, a pair of jaw carriers pivotally mounted on said support, jaws pivotally mounted on said carriers, and means for moving said carriers toward and away from each other, the movement of each carrier and its jaw being sufficiently independent of the movement of the other carrier and jaw to enable each jaw to conform to slightly different positions of said blank molds and said blow molds when said molds are at the transfer station.

26. In combination with a plurality of co-operating blank and blow molds moving in a closed path and adapted to successively occupy substantially the same axial position at a transfer station, a transfer device located at said transfer station for transferring parisons from said blank molds to said blow molds, said device comprising a fixed support, jaw carriers movably mounted on said support, jaws movably mounted on said carriers for engagement with the parisons, and means for actuating said carriers to open and close said jaws, said means permitting said jaws and carriers to move horizontally relative to said support when in a closed position to enable said jaws to conform to slight differences in the axial positions of said molds at said transfer station.

27. In a glass shaping machine, the combination of a split mold, a split neck ring co-operating therewith, ware supporting tongs, means for opening the neck ring, means for closing the tongs upon the exposed neck of the ware, and means operable thereafter to open the mold.

Signed at Hartford, Connecticut, this 5th day of August, 1921.

HOMER A. GENEST.